United States Patent [19]

Jung et al.

[11] Patent Number: 5,283,290
[45] Date of Patent: Feb. 1, 1994

[54] COATING AGENTS OF ACRYLIC COPOLYMER AND POLYESTER WITH TERTIARY AMINO GROUPS AND EPOXY RESIN

[75] Inventors: Werner A. Jung, Aschberg, Fed. Rep. of Germany; Udo Vorbeck, Toledo, Ohio

[73] Assignee: BASF Lacke & Farben AG, Munster, Fed. Rep. of Germany

[21] Appl. No.: 573,037

[22] Filed: Aug. 31, 1990

[30] Foreign Application Priority Data

Mar. 2, 1988 [DE] Fed. Rep. of Germany ....... 3806641

[51] Int. Cl.$^5$ ...................... C08L 33/14; C08L 63/02; C08L 67/02
[52] U.S. Cl. ................................... 525/111; 427/386; 523/434; 523/436; 525/65
[58] Field of Search ................................ 525/111, 65

[56] References Cited

U.S. PATENT DOCUMENTS 4,374,716  2/1983  Pacifici et al. .................... 528/291
4,839,448  6/1989  Jung et al. ......................... 526/265

FOREIGN PATENT DOCUMENTS 123793   11/1984  European Pat. Off. .
2016060  10/1970  Fed. Rep. of Germany .
3534858   4/1987  Fed. Rep. of Germany .
3629470   3/1988  Fed. Rep. of Germany .
63-27523  2/1988  Japan .

OTHER PUBLICATIONS

Patent Abstract of Japan, Band 12, Nr. 237 (C-509) [3084] Jul. 6, 1988 and JP, A, 63-27523 (Dainippon Ind. & Chem.), Feb. 5, 1988.
WPI, File Supplier, AN=77-56429Y, Derwent Publications Ltd. (London, GB) & JP, A, 5276338 (Toray Ind. K.K.) Jun. 27, 1977.

*Primary Examiner*—Robert E. Sellers
*Attorney, Agent, or Firm*—Kenyon & Kenyon

[57] ABSTRACT

The present invention relates to a coating agent containing A) a component containing carboxyl and tertiary amino groups and a polyepoxy resin B). A) consists of 10 to 90% by weight of a carboxyl- and amino-containing polyacrylate (A1) having an acid number from 20 to 140 and an amine number from 5 to 60 and 90 to 10% by weight of a carboxyl- and amino-containing polyester (A2) having an acid number from 10 to 160 and an amine number from 3 to 90.

(A2) is obtainable by reaction of
a) polycarboxylic acids or anhydrides thereof, if desired together with monocarboxylic acids,
b) polyols, if desired together with monools, and
c) further modifying components and, if desired,
d) a component which reacts with the reaction product from a), b) and possibly c), with the proviso that the final product contains tertiary amino groups originating from component a) and/or b) and/or d), the sum of components (A1) to (A2) being 100% by weight.

34 Claims, No Drawings

COATING AGENTS OF ACRYLIC COPOLYMER AND POLYESTER WITH TERTIARY AMINO GROUPS AND EPOXY RESIN

The present invention relates to coating agents based on polycondensatio and/or addition products containing carboxyl groups and amino groups and to the use thereof.

It is known that compounds which contain an epoxide ring react with carboxyl-containing compounds with ring opening. If compounds having more than one epoxy group and more than one carboxyl group are used, the reaction proceeds with the formation of polymeric esters containing secondary hydroxyl groups. This polymer formation is known under the name of "acid-curing epoxy resins".

It is known that this epoxy/carboxyl reaction can be catalyzed b suitable basic compounds. Suitable basic catalysts are, for example, diazabicyclooctane, diazabicyclononene, diazabicycloundecene, imidazole derivatives, such as 3-methyl-, phenyl- or cyclohexyimidazole, trialkylamine, such as triethylamine, tributylamine, tricyclohexylamine, N,N'-dialkylpiperazines, trialkylphosphines and triarylphosphines, hydroxides, carbonates and alkali metal salts of organic acids, such as lithium hydroxide, potassium carbonate, sodium and lithium benzoate. Further suitable catalysts are chelates of magnesium, aluminum and titanium.

EP-B 51,275 has disclosed a reactive curable binder mixture based on special polycarboxylic acid units which is based on 1.) polymerization and/or condensation products in which carboxyl groups are formed, for example, by an addition reaction of cyclic carboxylic anhydrides with OH-acrylates and 2.) aliphatic or cycloaliphatic epoxy compounds. The advantage of the curable binder mixture is that a catalyst for the carboxyl/epoxy crosslinking is present in the form of metal salts together with the binder, thus making an external catalyst unnecessary.

EP-A 123,793 has disclosed a composition which is cured at as low as room temperature and consists of polyepoxides and polymers which contain carboxyl groups and tertiary amino groups and are formed by reaction of vinyl polymers containing acid anhydride and carboxyl groups with compounds which contain at least one active hydrogen atom capable of reacting with acid anhydrides and at least one tertiary amino group, such as, for example, tertiary amino alcohols. The compositions described have the advantage that they are cured at as low as room temperature, have good resistance to benzine, water and alkali and no undesirable discolorations owing to tertiary amino compounds occur.

However, the carboxyl-containing acrylates of EP-A 123,793 have the disadvantage of being incompatible with polar epoxides (for example based on a reaction product of melamine resins with acrylamide with subsequent epoxidation of the acrylic double bond).

German Offenlegungsschrift 2,635,177 has disclosed compositions of acrylate resins and di- and polyepoxides. α,β-Ethylenically unsaturated carboxylic acids have been incorporated into the acrylate resins by polymerization, and the resins have an acid number of 70 to 250. The compositions have a high solids content and give good results with respect to mechanical properties, resistance to chemicals and solvents and corrosion resistance.

JP-OS 76,338/77 has disclosed a coating composition obtainable by mixing acrylate copolymers of acrylic esters, carboxyl-containing monomers and acrylic monomers containing tertiary nitrogen, such as, for example, diethylaminoethyl acrylate, with polyepoxides. The coating compositions can be cured at low temperatures and have a high solids content.

WO 87/02041 has disclosed coating agents based on polyepoxides and branched carboxyl- and amino-containing acrylate resins, in which the acrylate resins have acid numbers between 15 and 200 and ar prepared using more than 3 to 30% by weight of a monomer having at least two polymerizable, olefinically unsaturated double bonds. These coating agents lead to coatings having good technical properties, although they are in need of improvement with respect to solvent resistance.

German Offenlegungsschrift 2,161,253 has disclosed alkyd resins containing tertiary amino groups and carboxyl groups which are crosslinked with melamine resins. Introduction of the tertiary amino groups into the alkyd resin is carried out by using 5 to 100% by weight, preferably 20 to 60% by weight, of nitrogen-containing polyhydric alcohols in the polycondensation.

German Offenlegungsschrift 2,016,060 has disclosed that the compatibility with other resins is improved by incorporation of tertiary amino groups in alkyd resins, thus making it possible also to prepare mixtures of polyesters containing tertiary amino groups with thermoplastic or heat-curable acrylic resins which, however, do not have tertiary amino groups. In contrast to the present invention, the curing of the resins or resin mixtures is carried out through a reaction with melamine and not with epoxy resins.

The object of the present invention was to improve the properties of the coating agents or the coatings based on an epoxy/carboxyl crosslinking with respect to the resistance to long-term stress caused by chemicals and solvents, with respect to the resistance to benzine, the elasticity of the coatings obtained by means of the coating agents, the gloss, corrosion resistance and with respect to the resistance to water and steam. In addition the compositions have to meet the requirement that they be curable, if necessary, at room temperature or at slightly elevated temperature and hence be usable for example, in automotive repair coating.

An additional object is to provide those coating compositions which have such a low color number that they can be used as clearcoat in general or, in a multi-layer system, as clearcoat on top of a basecoat.

Furthermore, the polymers containing carboxyl and tertiary amino groups must also be compatible with polar epoxides, that is to say, for example epoxides based on a reaction product of melamine resins with acrylamide with subsequent epoxidation of the acrylic double bond.

Surprisingly, this object is achieved by a coating agent containing

A) a carboxyl- and tertiary-amino-containing component (A),
B) an epoxy resin as crosslinking agent having on average more than one epoxy group per molecule,
C) one or more organic solvents,
D) if desired, pigments, customary auxiliaries and additives, and in which the ratio of the free carboxyl groups of component (A) to the number of epoxy groups is in the range from 1:3 to 3:1, the essential aspect according to the invention being that the component (A) consists of 1) 10 to 90% by weight of a carboxyl- and tertiary amino-containing polyacrylate (A1) having an acid number of 20 to 140, preferably 30 to 90, an amine number of 5 to 60, preferably 10 to 40,
2) 90 to 10% by weight of a carboxyl- and tertiary amino-containing polyester (A2) having an acid number of 10 to 160, preferably 20 to 120, and an amine number of 3 to 90, preferably 10 to 60, where the polyester (A2) is obtainable by reaction of
   a) polycarboxylic acids or anhydrides thereof, if desired together with monocarboxylic acids,
   b) polyols, if desired together with monools, and, if desired,
   c) further modifying components and, if desired,
   d) a component which reacts with the reaction product from a), b) and possibly c),
   with the proviso that the final product contains tertiary amino groups originating from component a) and/or b) and/or d),
   the sum of the components (A1) to (A2) amounting to 100% by weight.

The preparation of component (A1) can be carried out by different methods. Thus, the carboxyl groups can be introduced into the polymer during the copolymerization by using carboxyl-containing monomers.

Examples of suitable carboxyl-containing monomers are acrylic acid, methacrylic acid, itaconic acid, crotonic acid, aconitic acid, maleic acid and fumaric acid and also their half esters, carboxyethyl acrylate, mono-2-methacryloyloxyethyl phthalate, mono-2-methacryloyloxyethyl hexahydrophthalate, mono-4-acryloyloxybutyl hexahydrophthalate and also caprolactone-modified acrylate monomers having COOH groups, such as, for example, the commercial product TONE XM 300 from Union Carbide Co./USA, a polyester acrylate based on caprolactone having a molecular weight of about 500 and a polymerizable double bond and a carboxyl group.

The introduction of the carboxyl groups into the acrylate resin (A1) can also be carried out—as described in WO 87/02041 or in EP-B 51,275—by first copolymerizing the corresponding monomers in an organic solvent at 70° to 130° C., preferably at 80° to 120° C., using at least 0.5% by weight, preferably at least 2.5% by weight, relative to the total weight of the monomers, of a polymerization regulator and using polymerization initiators to give a precrosslinked, non-gelled hydroxyl-containing product and, after the copolymerization is completed, carrying out the reaction with the cyclic acid anhydrides.

It is of course also possible to add cyclic acid anhydrides onto polyacrylates which apart from hydroxyl groups already contain carboxyl groups. Examples of suitable acid anhydrides are listed in WO 87/02041.

The introduction of the tertiary amino groups can also be carried out during the copolymerization by using monomers having tertiary amino groups, such as is described, for example, in WO 87/02041. Examples of suitable ethylenically unsaturated compounds having a tertiary amino group are N,N'-dimethylaminoethyl methacrylate, N,N'-diethylaminoethyl methacrylate, 2-vinylpyridine, 4-vinylpyridine, vinylpyrroline, vinylquinoline, vinylisoquinoline, N,N'-dimethylaminoethyl vinyl ether and 2-methyl-5-vinylpyridine.

The introduction of the tertiary amino groups into the polymer can preferably be carried out in such a way that a) an amino alcohol having a tertiary amino group or an equivalent compound is reacted with b) a polyisocyanate to give a compound which on the average contains 0.8 to 1.5, preferably 1, free isocyanate groups and at least one tertiary amino group per molecule. This compound is then added onto an acrylate having carboxyl and hydroxyl groups. Suitable diisocyanates are in particular those in which the isocyanate groups have different reactivities, such as, for example, isophorone diisocyanate. If polyisocyanates having NCO groups of identical reactivity are used, it is preferred to use the polyisocyanate in excess and then to distill off the excess, thus obtaining a 1:1 adduct. A more detailed description of this preparation process can be found in German Patent Application 3,731,652 and also in German Offenlegungsschrift 2,836,830, in which this process for the introduction of tertiary amino groups into hydroxyl-containing polymers has been described for the preparation of binders for the cathodic electro-dipping process.

The introduction of the tertiary amino groups into the polymer molecule can also be carried out by addition reaction of amino alcohols with polyacrylates containing glycidyl groups. This route has been described in German Offenlegungsschrift 2,900,592. The addition is followed by an addition reaction of cyclic carboxylic anhydrides.

Preferably, a soluble, precrosslinked acrylate copolymer is used as polyacrylate (A1). These polymers are prepared by using more than 3 to 30% by weight of monomers having at least two polymerizable, olefinically unsaturated double bonds, relative to the total weight of the monomers. The tertiary amino group can be introduced into the precrosslinked polyacrylate by various methods, for example by using tertiary amines having a copolymerizable double bond. The soluble precrosslinked polyacrylates and their preparation are described in WO 87/02041. The advantage of these polyacrylates is inter alia, that the resulting films have good resistance to solvents and water and dry relatively quickly.

Preferably, the acrylate copolymer (A1) has an OH number of more than 20 mg of KOH/g, since in this case a particularly good compatibility with polar polyepoxides which were used as crosslinking agents is obtained. Suitable polycarboxylic acids (component a)) for the preparation of the polyesters (A2) are, for example, phthalic acid, isophthalic acid, terephthalic acid, halophthalic acids, such as tetrachloro- or tetrabromophthalic acid, hexahydrophthalic acid, adipic acid, sebacic acid, fumaric acid, maleic acid, endomethylenetetrahydrophthalic acid, 1,1,3-trimethyl-3-phenylindane-4',5-dicarboxylic acid, trimellitic acid and anhydrides of the acids mentioned, if they exist.

For the preparation of polyesters having the lowest possible color number, the use of aliphatic and cycloaliphatic polycarboxylic acids or their anhydrides, which are not prepared by the oxo process, is preferred. Particular preference is given to the use of cyclohexanedicarboxylic acid, since it leads to colorless polymers, which furthermore at the same time give good drying and development of hardness in the paint film. If desired it is also possible to use monocarboxylic acids together with the polycarboxylic acids, such as, for example, benzoic acid, tert.-butylbenzoic acid, lauric acid, isononanoic acid and fatty acids of naturally occurring oils.

In a preferred embodiment, it is possible to use, inter alia, or exclusively aminocarboxylic acids having at least one tertiary amino group as component a) (carboxylic acid component). Examples of these are: pyridine-2-carboxylic acid, pyridine-3-carboxylic acid, pyridine-4-carboxylic acid and pyridine-2,6-dicarboxylic acid. Of these, nicotinic acid, that is, pyridine-3-carboxylic acid, is preferably used, because this acid is a very reactive aminocarboxylic acid with respect to catalysis of the acid/epoxide reaction.

Advantageously, the reaction product of an amino alcohol having at least one tertiary amino group and a polycarboxylic anhydride can also be used as component a). An example of such a reaction product is the reaction product from 2-hydroxyethylpyridine with phthalic anhydride.

Furthermore, the reaction product from a polyamine having at least one tertiary and at least one primary or secondary, preferably secondary, amino group and a polycarboxylic anhydride can be used as component a).

Suitable alcohol components b) for the preparation of polyester (A2) are polyhydric alcohols, such as ethylene glycol, propane diols, butane diols, pentane diols, hexane diols, neopentyl glycol, diethylene glycol, cyclohexanedimethanol, trimethylpentanediol, ditrimethylolpropane, trimethylolethane, trimethylolpropane, glycerol, pentaerythritol, dipentaerythritol, trishydroxyethyl isocyanurate, polyethylene glycol, polypropylene glycol, if desired, together with monohydric alcohols, such as, for example, butanol, octanol, lauryl alcohol, and ethoxylated or propoxylated phenols.

Preferably, it is possible to use as alcohol component b), inter alia or even exclusively, amino alcohols having at least one tertiary amino group. Examples of these are 2-hydroxyethylpyridine, dimethylaminopropanol, methyldiethanolamine, methyldipropanolamine and dihydroxyethylaniline. Reaction products of epoxy resins with carboxylic acids and/or amines are also preferably used as alcohol component b).

Accordingly, the alcohol component b) used can be the reaction product of low-molecular-weight epoxy resins with polycarboxylic acids and/or polycarboxylic anhydrides and aminocarboxylic acids having at least one teriary amino group and/or polyamines having at least one tertiary and at least one primary or secondary amino group, this reaction product being subsequently, if desired, additionally esterified with the acid and the alcohol component and, if desired, modified with polyisocyanates. Low-molecular-weight epoxy resins are understood to mean epoxy resins having a molecular weight of less than about 2,000.

In the case of epoxy resins, low-chlorine types should be used, since otherwise the products may become strongly discolored.

Preferably, polyisocyanates and/or diepoxy compounds, if desired also monoisocyanates and/or monoepoxy compounds, are used as modifying component c). Examples of suitable polyisocyanates are the toluylene diisocyanates, hexamethylene methylene diisocyanate and also isophorone diisocyanate. Diepoxy compounds are understood to mean epoxy resins having on average about two epoxy groups per molecule. Examples of suitable monoepoxy compounds are olefin oxides, such as octylene oxide, butyl glycidyl ether, allyl glycidyl ether, phenyl glycidyl ether, p-butylphenol glycidyl ether, cresyl glycidyl ether, styrene oxide, glycidyl methacrylate, cyclohexenevinyl monoxide, dipentene monoxide, α-pinene oxide and also glycidyl esters of tertiary carboxylic acids.

Preferably, monoisocyanates having at least one tertiary amino group are used as components (d) which are capable of reacting with the reaction product from a), b) and possibly c). These can be prepared, for example, by reaction of suitable diisocyanates, such as isophorone diisocyanate, with amino alcohols having a tertiary amino group, such as, for example, hydroxyethylpyridine or dimethylaminoethanol, or with polyamines having at least one tertiary and at least one secondary or primary amino group. The monoisocyanates are bound to the binder system by reaction with free hydroxyl groups of the polycondensation and/or addition product with the formation of a urethane bond.

It is also possible to use polyamines having at least one tertiary and at least one primary or secondary amino group as component d). An example of a suitable polyamine is dimethylaminopropylmethylamine.

It is also possible to use the ring-opened product of epoxy resins with compounds having active hydrogen atoms as alcohol component. Thus, for example, in a step-wise reaction first diepoxides, such as the known Epikote types, can be reacted with dicarboxylic acids, such as, for example, pyridine-2,6-dicarboxylic acid, to give a precursor which is then used further as alcohol component.

Further components a) to d) suitable for the synthesis of the polyester resin (A2) can be obtained from German Patent Application 3,629,470.

It is any case an essential aspect of the invention that the final product obtained has an acid number in the range from 10 to 160, preferably from 20 to 120, and an amine number in the range from 3 to 90, preferably 10 to 60. By adding antioxidants or reducing agents, such as, for example, hypophosphorous acid, too strong a discoloration of the products during the condensation is avoided.

The preparation of the polyesters and acrylates containing carboxyl and tertiary amino groups is carried out in a conventional manner starting from the compounds mentioned.

In the case of all two-step variants in which a cyclic acid anhydride is added onto a hydroxyl-containing polymer, it is preferred to carry out the partial dissolution of the resin after the addition reaction not with primary but with secondary or tertiary alcohols, thus suppressing the alcoholysis of the half ester bond which takes place as a side reaction.

It is an essential aspect of the invention that the carboxyl- and amino-containing component (A) of the coating agent is a mixture of the acrylate resin (component A1) described having an acid number from 20 to 140, preferably 30 to 90, and an amine number from 5 to 60, preferably 10 to 40, and the polyester resin (component A2) described having an acid number of from 10 to 160, preferably 20 to 120, and an amine number from 3 to 90, preferably 10 to 60. The mixing ratio is 10 to 90% by weight of polyacrylate (A1) and 90 to 10% by weight of polyester (A2). However, preferably the mixing ratio is 40 to 90% by weight of polyacrylate (A1) and 10 to 60% by weight of polyester (A2), since these mixing ratios lead to coatings having particularly good properties.

The crosslinking agent contained in the coating agent according to the invention is an epoxy resin (B) having on average more than one epoxy group per molecule, in which the ratio of the free carboxly groups of component (A) to the number of epoxy groups of the epoxy resin is in the range from 1:3 to 3:1. Examples of suitable epoxy resins are condensation products from epichlorohydrin and bisphenol A, for example cycloaliphatic bisepoxides, epoxydized polybutadienes formed by reaction of commercially available polybutadiene oils with peracids or organic acid/$H_2O_2$ mixtures, epoxidation products of naturally occurring fats, oils, fatty acid derivatives, modified oils, epoxy-containing novolaks, glycidyl ethers of a polyhydric alcohol, for example ethylene glycol diglycidyl ether, glycerol polyglycidyl ether, sorbitol polyglycidyl ether, trimethylolpropane polygycidyl ether and pentaerythritol polyglycidyl ether and also suitable acrylate resins having attendant oxirane groups. Furthermore it is also advantageous to use, as crosslinking agents, reaction products of hydroxyl-containing polyepoxides with di- or polyisocyanates, such as are formed, for example, by reaction of OH-functional epoxides, such as, for example, sorbitol polyglycidyl ethers, with isophorone diisocyanate.

Other crosslinking agents which are preferably used are polar epoxides, for example based on a reaction product of melamine resins with acrylamide with subsequent epoxidation of the acrylic double bond. An example of this class of substances is the commercial product Santolink LSE 4103 from Monsanto Co., in which the epoxy resin basic structure is a dinuclear melamine, the molecular weight is about 1200 and the epoxide equivalent weight about 300. Examples of suitable solvents (component C)) for the coating agents according to the invention are toluene, xylene, butanol, ethyl acetate, butyl acetate, pentyl acetate, dimethyl glutarate, dimethyl succinate, 1-methoxy-propyl 2-acetate, 2-ethylhexanol, ethylene glycol diacetate, ethylene glycol monoethyl and monobutylether or acetates thereof, ethylene glycol dimethyl ether, diethylene glycol dimethyl ether, benzines containing aromatics, cyclohexanone, methyl ethyl ketone, acetone, butyl acetoxyglycolate, ethyl acetoxyglycolate.

These solvents can be used individually or also as mixtures of different solvents.

The coatings agents according to the invention can furthermore contain, as component (D), if desired, pigments and also auxiliaries and additives. Suitable additives and auxiliaries are, for example, fillers, such as, for example, talcum, mica, kaolin, chalk, quartz powder, asbestos powder, barium sulfate, silicates, glass fibers, and anti-settling agents, such as, for example, finely dispersed silica bentonite, colloidal silicates and the like.

The coating agents according to the invention can be applied to a large range of substrates. Examples of suitable substrates are metals, such as iron, zinc, titanium, copper, aluminum, steel, brass, bronze, magnesium or the like, furthermore ceramic, wood, glass, concrete and plastics.

The coating agents according to the invention are curable at relatively low temperature, that is, at room temperature or slightly elevated temperatures. The low curing temperature and the short curing time are due to the presence of an internal catalyst in the binder system. If short curing times and low curing temperatures are desired, a component (A) having a relatively high amine number is used.

The coating agents according to the invention lead to coatings having improved resistance to water, steam and in particular to organic solvents and also to coatings having improved elasticity. Compared with coating agents based on polyester/epoxide containing carboxyl and tertiary amino groups or based on acrylate/epoxide containing carboxyl and tertiary amino groups, the combinations according to the invention are distinguished by a reduced viscosity compared to the mean value calculated arithmetically.

By suitable selection of the individual synthetic components for the polyester and the acrylate resin and also by suitable selection of the mixing ratio, the properties of the final product can be controlled in a highly efficient manner.

Thus, the use of cyclohexanedicarboxylic acid or other dicarboxylic acids which were not prepared by the oxo process lead to products having a particularly small color number, good drying and curing development in the paint film.

The concomitant use of suitable monocarboxylic acids for the synthesis of the polyester can also affect hardness and elasticity. The use of benzoic acid gives relatively hard films, whereas the use of fatty acids gives significantly softer films. The use of hexanediols as alcohol component leads to elastic films, whereas the use of neopentyl glycol and pentaerythritol leads to relatively hard coatings.

Aromatic tertiary amino groups in the binder system have a higher catalytic activity than aliphatic or araliphatic amino groups.

Owing to the low curing temperatures and the short curing times, the coating agents according to the invention are preferably used for automotive repair coating.

Furthermore they are highly suitable as topcoat, filler, clearcoat, primer or basecoat.

The selection of the epoxy resin depends on the intended use. If used as topcoat, aliphatic epoxy resins are preferably employed, while for basecoats aromatic epoxy resins are also suitable.

The problem of discoloration, which may occur if they are used as clear coat, can be bypassed by preferably incorporating aliphatic tertiary amino groups in the binder system. In the case of clear coats, low-chlorine or chlorine-free epoxy resins should be used; in this way, no discoloration phenomena occur.

If the curing is to be carried out under baking conditions, that is, at temperatures of at least 100° C., the coating agent according to the invention can additionally contain a hot-curable synthetic resin containing ether and/or amino and/or OH groups, such as, for example, phenolic or amino resins.

The present invention also relates to a process for the preparation of coating agents containing A) a carboxyl- and tertiary-amino-containing component (A), B) an epoxy resin as crosslinking agent having on average more than one epoxy group per molecule, C) one or more organic solvents, D) if desired, pigments, customary auxiliaries and additives, in which the ratio of free carboxyl groups of component (A) to the number of epoxy groups is in the range from 1:3 to 3:1, wherein component (A) consists of 1) 10 to 90% by weight of a carboxyl- and tertiary amino-containing polyacrylate (A1) having an acid number of 20 to 140, preferably 30 to 90, an amine number of 5 to 60, preferably 10 to 40, 2) 90 to 10% by weight of a carboxyl- and tertiary amino-containing polyester (A2) having an acid number of 10 to 160, preferably 20 to 120, and an amine number of 3 to 90, preferably 10 to 60, where the polyester (A2) is obtainable by reaction of a) polycarboxylic acids or anhydrides thereof, if desired together with monocarboxylic acids,
b) polyols, if desired together with monools, and, if desired,
c) further modifying components and, if desired,
d) a component which reacts with the reaction product from a), b) and possibly c), with the proviso that the final product contains tertiary amino groups originating from component a) and/or b) and/or d), the sum of the components (A1) to (A2) amounting to 100% by weight.

The compounds which are suitable for use in the process according to the invention are the coating agents according to the invention already listed in the description.

The preparation of the polyester and acrylate resins used in the process according to the invention and containing carboxyl and tertiary amino group is also listed in the description of the coating agents according to the invention.

The preparation of the coating agents from components (A) to (D) is carried out in a known manner by mixing and, if necessary, dispersion of components (A) to (D).

Advantageous embodiments of the process according to the invention are evident from the qualitative and quantitative selection of specific synthetic components for the coating agent which has already been mentioned in the description of the coating agents according to the invention.

The coating agents prepared according to the invention lead to coatings having improved resistance to water, steam and in particular to organic solvents and also to coatings having improved elasticity. Compared with coating agents based on polyester/epoxide containing carboxyl and tertiary amino groups or based on acrylate/epoxide containing carboxyl and tertiary amino groups, the combinations according to the invention are distinguished by a reduced viscosity compared to the mean value calculated arithmetically.

The invention is illustrated in more detail below by means of examples. Parts are by weight, unless noted otherwise.

EXAMPLE 1

Preparation of the Polyester Resin I 446.0 parts of hexahydrophthalic anhydride, 480.8 parts of isophthalic acid, 330.6 parts of trimethylolpropane, 269.9 parts of pentaerythritol, 229.8 parts of methyldiethanolamine, 196.3 parts of benzoic acid, 254.2 parts of isononanoic acid, 91.9 parts of xylene and 2.207 parts of triisodecyl phosphite are placed in a 4 liter polycondensation kettle equipped with stirrer, steam-heated column and water separator, and the mixture is slowly heated. The condensation is carried out at a maximum temperature of 190° C. until an acid number of 20 mg of KOH/g and a viscosity of 7.9 dPas (50% strength in butyl glycol) have been reached, followed by cooling and partial dissolution of the reaction product with 410.0 parts of xylene at 130° C. 307.23 parts of hexahydrophthalic anhydride, 76.0 parts of xylene and 0.908 part of triisodecyl phosphite are then added to this solution. The addition reaction of the anhydride is carried out at 120° C. until an acid number of 69.8 and a viscosity of 18 dPas (50% strength in butyl glycol) have been reached. The product is then partially dissolved with 798.1 parts of xylene and 114.0 parts of secondary butanol. The polyester thus obtained has a solids content of 59%, an acid number of 69.8, an amine number of 28.8 and a color number of 4-5 (Gardner-Holdt).

EXAMPLE 2

Preparation of the Polyester Resin II 482.2 parts of hexahydrophthalic anhydride, 585.3 parts of 1,4-cyclohexanedicarboxylic acid, 611.8 parts of trimethylolpropane, 123.1 parts of 1,6-hexanediol, 155.2 parts of methyldiethanolamine, 79.6 parts of benzoic acid, 206.1 parts of isononanoic acid, 87.8 parts of xylene and 2.196 parts of triisodecyl phosphite are placed in a 4 liter polycondensation kettle equipped with stirrer, steam-heated column and water separator, and the mixture is slowly heated. The condensation is carried out at a maximum temperature of 190° C. until an acid number of 9.1 mg of KOH/g and a viscosity of 4.2 dPas (50% strength in butyl glycol) have been reached, followed by cooling and partial dissolution of the product with 387.4 parts of xylene at 130° C. 367.0 parts of hexahydrophthalic anhydride, 80.9 parts of xylene and 0.742 part of triisodecyl phosphite are then added to this solution. The addition reaction of the anhydride is carried out at 120° C., until an acid number of 69.4 and a viscosity of 8 dPas (50% strength in butyl glycol) have been reached. The product is then partially dissolved with 718.6 parts of xylene and 182.1 parts of secondary butanol. The polyester thus obtained has a solids content of 59.7%, an acid number of 67 (solid), an amine number of 31, a viscosity (original) of 27.5 dPas and a color number of 1-2 (Gardner-Holdt).

EXAMPLE 3

Preparation of Acrylate Resin I 484.0 parts of xylene and 161.0 parts of 1-methoxypropyl 2-acetate are weighed in a 4 liter stainless steel polymerization kettle equipped with stirrer, reflux condenser, two monomer feeds and one initiator feed, and the mixture is heated to 110° C. The following are weighed into the monomer feed A:
80.0 parts of dimethylaminoethyl methacrylate
90.0 parts of xylene
30.0 parts of 1-methoxypropyl 2-acetate
The following are weighed into the monomer feed B:
143.0 parts of methyl methacrylate
120.0 parts of n-butyl acrylate
120.0 parts of cyclohexyl methacrylate
20.0 parts of 4-hydroxybutyl acrylate
120.0 parts of hydroxyethyl methacrylate
97.0 parts of divinylbenzene (62% strength in ethyl styrene)
22.4 parts of mercaptoethanol
0.24 part of triisodecyl phosphite
The following are weighed into the initiator feed:
19.2 parts of 2,2'-azobis(2-methylbutyronitrile)
58.0 parts of xylene
19.2 parts of 1-methoxypropyl 2-acetate
The addition of all feeds is started simultaneously; the two monomer feeds are evenly metered in over a period of 3 hours and the initiator feed is metered in over a period of 3.75 hours. During the polymerization, the temperature in the kettle is maintained at 108° to 110° C. The polymerization is then allowed to continue for another 2 hours. The acrylate resin solution thus obtained has a solids content of 51% and a viscosity of 24 dPas. 169.0 parts of hexahydrophthalic anhydride are then added, and the addition reaction with the acrylate resin is carried out at 110° C. After the determination of the acid number in aqueous and alcoholic KOH gives the same values, the mixture is concentrated to a solids content of 55–56% by distilling off solvents and subsequently diluted with secondary butanol to a solids content of 51%. The acrylate resin solution thus obtained has an acid number of 72 and a viscosity of 27 dPas and an amine number of 28.6.

EXAMPLE 4

Preparation of Acrylate Resin II 382.0 parts of xylene and 382.0 parts of 1-methoxypropyl 2-acetate ar weighed into a 4 liter stainless steel polymerization kettle equipped with stirrer, reflux condenser, two monomer feeds and one initiator feed, and the mixture is heated to 110° C.

The following are weighed into the monomer feed A:
82.0 parts of dimethylaminoethyl methacrylate
350.0 parts of mono-2-methacryloyloxyethyl hexahydrophthalate
100.0 parts of xylene
100.0 parts of 1-methoxypropyl 2-acetate The following are weighed into the monomer feed B:
148.0 parts of butylmethacrylate
124.0 parts of n-butyl acrylate
124.0 parts of cyclohexyl methacrylate
72.0 parts of hydroxypropyl methacrylate
100.0 parts of divinylbenzene (62% strength in ethyl styrene)
24.0 parts of mercaptoethanol
0.53 part of triisodecyl phosphite The following are weighed into the initiator feed:
20.0 parts of 2,2,-azobis(2-methylbutyronitrile)
40.0 parts of xylene
40.2 parts of 1-methoxypropyl 2-acetate The addition of the monomer feeds is started simultaneously and that of the initiator feed is started 10 minutes later. The two monomer feeds are evenly metered in over a period of 3 hours and the initiator feed is metered in over a period of 3.75 hours. During the polymerization, the temperature in the kettle is maintained at 108°–110° C. The polymerization is then allowed to continue for another 2 hours. The mixture is concentrated to a solids content of about 60% by distilling off the solvents and then diluted with secondary butanol. The acrylate resin solution thus obtained has a solids content of 51% and an acid number of 67 and an amine number of 34.

EXAMPLE 5

Preparation of Coating Agents

These COOH polymers were crosslinked by means of an aliphatic epoxy resin having a molecular weight of about 1200 and an epoxide equivalent weight of about 300. The basic structure of this epoxy resin (commercial name LSE 4103 from Monsanto Co.) is a dinuclear melamine resin reacted with acrylamide followed by epoxidation of the acrylic double bonds.

Polyester resin II (lacquer 1), acrylate resin I (lacquer 2) and a 1:2 mixture (lacquer 3) of polyester and acrylate late were mixed with this epoxy resin. The lacquer mixtures thus prepared were applied as clear coating composition by the wet-in-wet process to a commercially available silver metallic basecoat (bases CAB, polyester, melamine resin, wax). The clear coats thus obtained were immediately tested for drying (dust-free, non-tacky), after drying for 24 hours at room temperature the pendulum hardness (according to König) and after 3 days the elasticity by means of Erichsen indentation were determined. Furthermore, the following tests were carried out:

1) A pressure test:
   A sheet of absorbent paper is folded 8 times so that a small square (4×4 cm) is formed. This square is laid on the film, and a weight of 500 g is placed on top of it. The film is then rated for marking or damage; 1 is very poor and 10 is very good—no marking.

2) A water drop test:
   1 ml of distilled water is poured on the clear coat and allowed to interact for 4 hours in a 50° C. oven in the absence of circulating air. The film is rated on a scale from 1 to 10:10 is without any marking, softening or other impairment of the film.

3) A benzine and xylene test:
   1 ml of the solvent is allowed to flow down a board set up at an angle of 45°. The film is rated for markings and softenings on a scale from 1 to 10, 10 denoting no impairment whatsoever.

TABLE 1

| Lacquer | Lacquer formulations | | |
|---|---|---|---|
| | 1 | 2 | 3 |
| Polyester II | 80.0 | — | 27.0 |
| Acrylate I | — | 80.0 | 53.0 |
| Epoxy resin | 27.5 | 27.0 | 26.5 |
| 1-Methoxy-2-propanol | 2.0 | 2.0 | 2.0 |
| Butyl acetate 85/100 | 11.5 | 11.5 | 11.5 |
| Xylene | 5.0 | 5.0 | 5.0 |
| Silicone oil | 0.5 | 0.5 | 0.5 |
| Light stabilizer 1 | 0.6 | 0.6 | 0.6 |
| Light stabilizer 2 | 0.4 | 0.4 | 0.4 |
| Original viscosity (efflux time in a DIN 4 cup) | 84" | 140" | 94" |
| The mixtures are set to 18" (efflux time DIN 4 cup) with solvent. | | | |
| Solids content at sprayable viscosity | 34.5% | 27.6% | 31.4% |

TABLE 2

| Lacquer | Test results | | |
|---|---|---|---|
| | 1 | 2 | 3 |
| Drying | | | |
| dust-free after | 60' | 30' | 40' |
| non-tacky after | 5h20' | 2h | 3h30' |
| Pressure test | 6 | 8 | 8 |
| Water drop test | 5 | 7 | 6–7 |
| Benzine test | 8 | 7 | 8 |
| Xylene test | 8 | 6 | 9 |
| Erichsen indentation (in mm) | 9.0 | 7.7 | 9.9 |
| Pendulum hardness (König) | 74" | 118" | 84" |
| Degree of gloss (20°) | 94% | 91% | 93% |

As the experiments show, by mixing the acrylate resins with the polyester resins it is possible, surprisingly, to achieve an improvement in the performance. Thus, the resistance to chemicals is increased by the mixture according to the invention and the elasticity is better than that of the individual components. Surprisingly, owing to mixing, the viscosity of the lacquers becomes considerably more favorable than corresponds to the purely arithmetical mean value. Mean value of original viscosity: 120", found in the mixture 94"; mean value of the solids content at sprayable viscosity 29.9%, found in the mixture 31.4%.

We claim:

1. A coating agent comprised of:
   A) a carboxyl- and tertiary-amino- groups containing component (A) and
   B) an epoxy resin crosslinking agent (B) having on average more than one epoxy group per molecule, such that the ratio of free carboxyl groups in component (A) to epoxy groups in component (B) ranges from 1:3 to 3:1, and wherein component (A) consists of:
   (1) 10 to 90% by weight of a carboxyl- and tertiary amino- group containing polyacrylate (A1) having an acid number of 20 to 140 and an amine number of 5 to 60; and
   (2) 90 to 10% by weight of a carboxyl- and tertiary amino- group containing polyester (A2) having an acid number of 10 to 160 and an amine number of 3 to 90;
   and the sum of the polyacrylate (A1) and the polyester (A2) is 100% by weight.

2. A coating agent as claimed in claim 1 wherein component (A) consists of:
   (1) 40 to 90% by weight of polyacrylate (A1) and
   (2) 10 to 60% by weight of polyester (A2), the sum of components (A1) and (A2) being 100% by weight.

3. A coating agent as described in claim 1 or 2 wherein said polyester (A2) is prepared from
   (a) a polycarboxylic acid or anhydride, or a polycarboxylic acid or anhydride and a monocarboxylic acid, and
   (b) a polyol or a polyol and a monohydric alcohol.

4. A coating agent as described in claim 1 or 2 wherein polyester (A2) is produced from an aminocarboxylic acid having at least one tertiary amino group.

5. A coating agent as described in claim 1 or 2 wherein polyester (A2) is produced from a cycloyhexane dicarboxylic acid.

6. A coating agent as described in claim 1 or 2 wherein polyester (A2) is produced from the reaction product of an amino alcohol containing at least one tertiary amino group and a polycarboxylic anhydride.

7. A coating agent as described in claims 1 or 2 wherein polyester (A2) is produced from an amino alcohol having at least one tertiary amino group.

8. A coating agent as described in claim 1 or 2 wherein polyester is produced from the reaction product of an epoxy resin with a carboxylic acid or amine.

9. A coating agent as described in claim 1 or 2 wherein polyester (A2) is further comprised of a polyisocyanate or diepoxy compound.

10. A coating agent as claimed in claim 1 or 2 wherein polyester (A2) is further comprised of:
    (d) a monoisocyanate having at least one tertiary amino group.

11. A coating agent as described in claim 1 or 2 wherein polyacrylate (A1) has a hydroxyl number of more than 20.

12. A coating agent as described in claim 1 or 2 wherein polyacrylate (A1) is the reaction product of a hydroxyl-containing acrylate resin and a compound containing on average 0.8 to 1.5 free isocyanate groups and at least one tertiary amino group per molecule.

13. A coating agent as described in claim 1 or 2 wherein the polyacrylate (A1) is a soluble pre-crosslinked acrylate copolymer.

14. A coating agent as described in claim 1 or 2 wherein carboxyl groups are introduced into component (A) by the addition of a cyclic acid anhydride onto an OH polymer, and by partial dissolution of the addition reaction product with a secondary or tertiary alcohol.

15. A process or the preparation of a coating agent comprising reacting:
    A) a carboxyl- and tertiary-amino- group containing component (A), and
    B) an epoxy resin crosslinking agent having on average more than one epoxy group per molecule, in which the ratio of free carboxyl groups of component (A) to epoxy groups in component (B) is in the range of from 1:3 to 3:1, and wherein component (A) consists of:
    (1) 10 to 90% by weight of a carboxyl- and tertiary amino- group containing polyacrylate (A1) having an acid number of 20 to 140 and an amine number of 5 to 60; and
    (2) 90 to 10% by weight of a carboxyl- and tertiary amino- group containing polyester (A2) having an acid number of 10 to 160 and an amine number of 3 to 90;
    and the sum of components (A1) and (A2) is 100% by weight.

16. The process described in claim 15 wherein component (A) consists of:
    (1) 40 to 90% by weight of polyacrylate (A1) and
    (2) 10 to 60% by weight of polyester (A2), the sum of components (A1) and (A2) being 100% by weight.

17. The process described in claim 15 wherein said polyester (A2) is prepared from
    (a) a polycarboxylic acid or anhydride, or a polycarboxylic acid or anhydride and a monocarboxylic acid, and
    (b) a polyol or a polyol and a monohydride alcohol.

18. The process described in claim 15 wherein polyester (A2) is produced from an aminocarboxylic acid having at least one tertiary amino group.

19. The process described in claim 15 wherein polyester (A2) is produced from a cyclohexane dicarboxylic acid.

20. The process described in claim 15 wherein polyester (A2) is produced from the reaction product of a polycarboxylic anhydride and an amino alcohol containing at least one tertiary amino group.

21. The process described in claim 15 wherein polyester (A2) is produced from an amino alcohol having at least one tertiary amino group.

22. The process described in claim 15 wherein polyester (A2) is produced from the reaction product of an epoxy resin and a carboxylic acid or amine.

23. The process described in claim 15 wherein the polyester (A2) is further comprised of (c) a polyisocyanate or diepoxy compound.

24. The process described in claim 15 wherein the polyester (A2) is further comprised of (d) a monoisocyanate having at least one tertiary amino group.

25. The process described in claim 15 wherein polyacrylate (A1) has an OH number of more than 20.

26. The process described in claim 15 wherein polyacrylate (A1) is prepared by reacting a hydroxyl-containing acrylate resin with a compound containing on average 0.8 to 1.5 free isocyanate groups and at least one tertiary amino group per molecule.

27. The process described in claim 15 wherein the polyacrylate (A1) used is a soluble pre-crosslinked acrylate copolymer.

28. The process described in claim 15 wherein the carboxyl groups are introduced into component (A) by addition of a cyclic acid anhydride onto an OH polymer and by partially dissolving the resin after this addition reaction is carried out using a secondary or tertiary alcohol.

29. A coating agent as described in claim 1 wherein the acid number of polyacrylate (A1) ranges from 30 to 90.

30. The process described in claim 15 wherein the amine number of polyacrylate (A1) ranges from 10 to 40.

31. A coating agent as described in claim 1 wherein the acid number of polyester (A2) ranges from 20 to 120.

32. A coating agent as described in claim 1 wherein the amine number of polyester (A2) ranges from 10 to 60.

33. The coating agent of claim 9 wherein component (c) of polyester (A2) is comprised of a polyisocyanate or diepoxy compound together with a monoisocyanate or a monoepoxide.

34. The coating agent of claim 12 wherein polyacrylate (A1) is comprised of the reaction product of a hydroxyl-containing acrylate resin and a compound containing, on average, one free isocyanate group and at least one tertiary amino group per molecule.

* * * * *

UNITED STATES PATENT AND TRADEMARK OFFICE
CERTIFICATE OF CORRECTION

PATENT NO. : 5,283,290
DATED : February 1, 1994
INVENTOR(S) : Jung, et al.

It is certified that error appears in the above-indentified patent and that said Letters Patent is hereby corrected as shown below:

In column 1, line 7, change "polycondensatio" to -- polycondensation --;

Column 2, line 11, change "ar" to -- are --;

Column 5, line 60, delete "methylene";

Column 10, line 50, change "20.0" to -- 120.0 --;

Column 10, line 55, change "150.24" to -- 0.24 --;

Column 13, line 49, change "polyester" to -- polyester (A2) --;

Column 14, line 7, change "or" to -- for --;

UNITED STATES PATENT AND TRADEMARK OFFICE
CERTIFICATE OF CORRECTION

PATENT NO. : 5,283,290
DATED : February 1, 1994
INVENTOR(S) : Jung, et al.

It is certified that error appears in the above-indentified patent and that said Letters Patent is hereby corrected as shown below:

Page 2 of 2

Column 14, line 38, change "monohydride" to -- monohydric --;

Column 15, line 14, change "The Process described in Claim 15" to -- a coating agent as described in Claim 29 --;

Signed and Sealed this

Ninth Day of May, 1995

Attest:

BRUCE LEHMAN

Attesting Officer

Commissioner of Patents and Trademarks